Nov. 17, 1964   R. H. REYNOLDS   3,157,427
TRAILERS HAVING LATERALLY SWINGABLE SECTIONS
Filed June 9, 1961   4 Sheets-Sheet 1
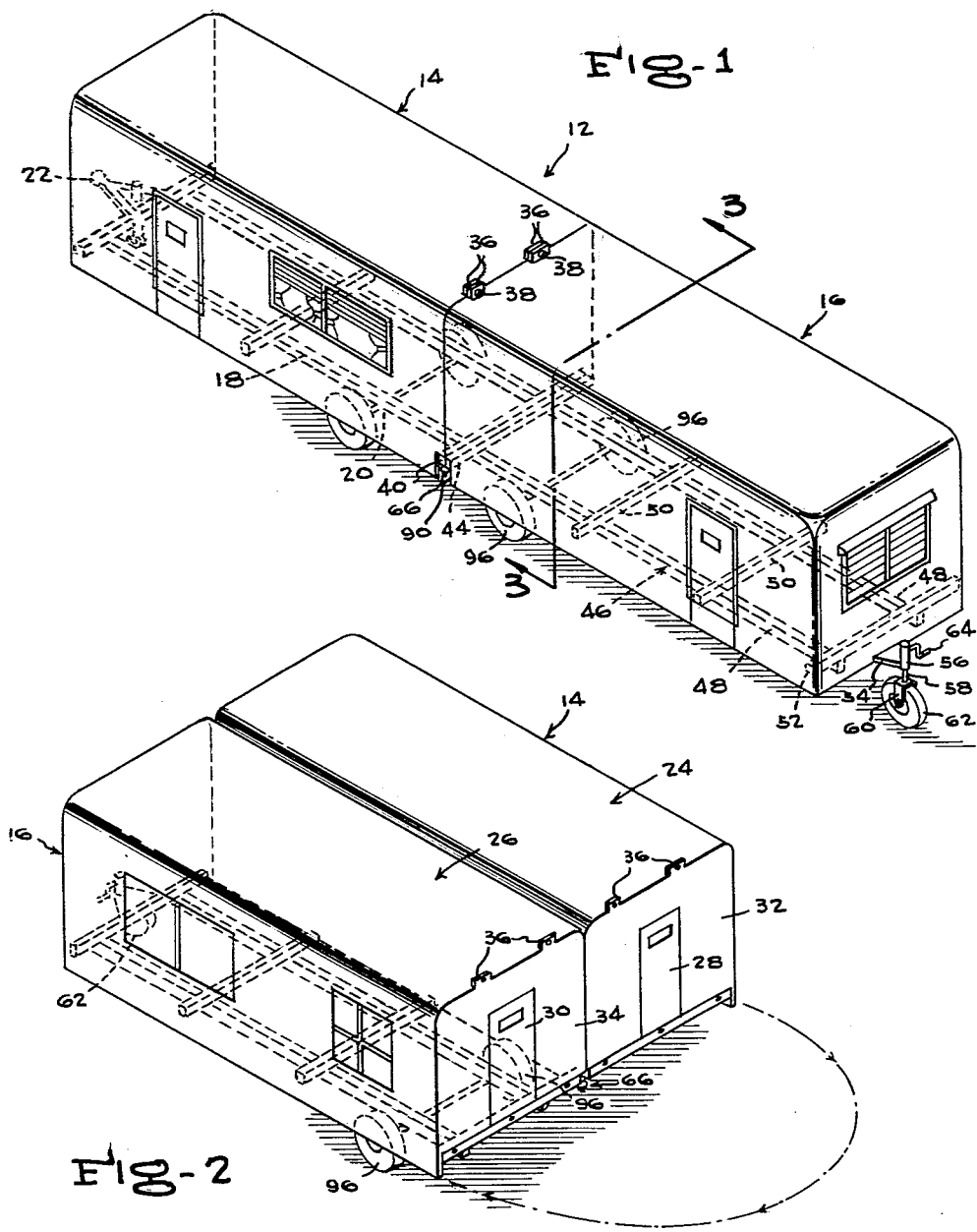
INVENTOR.
ROBERT H. REYNOLDS
BY
McMorrow, Berman & Davidson
ATTORNEYS Nov. 17, 1964  R. H. REYNOLDS  3,157,427

TRAILERS HAVING LATERALLY SWINGABLE SECTIONS

Filed June 9, 1961  4 Sheets-Sheet 2

INVENTOR.
ROBERT H. REYNOLDS
BY
McMorrow, Berman & Davidson
ATTORNEYS

INVENTOR.
ROBERT H. REYNOLDS
BY
*McMorrow, Berman & Davidson*
ATTORNEYS

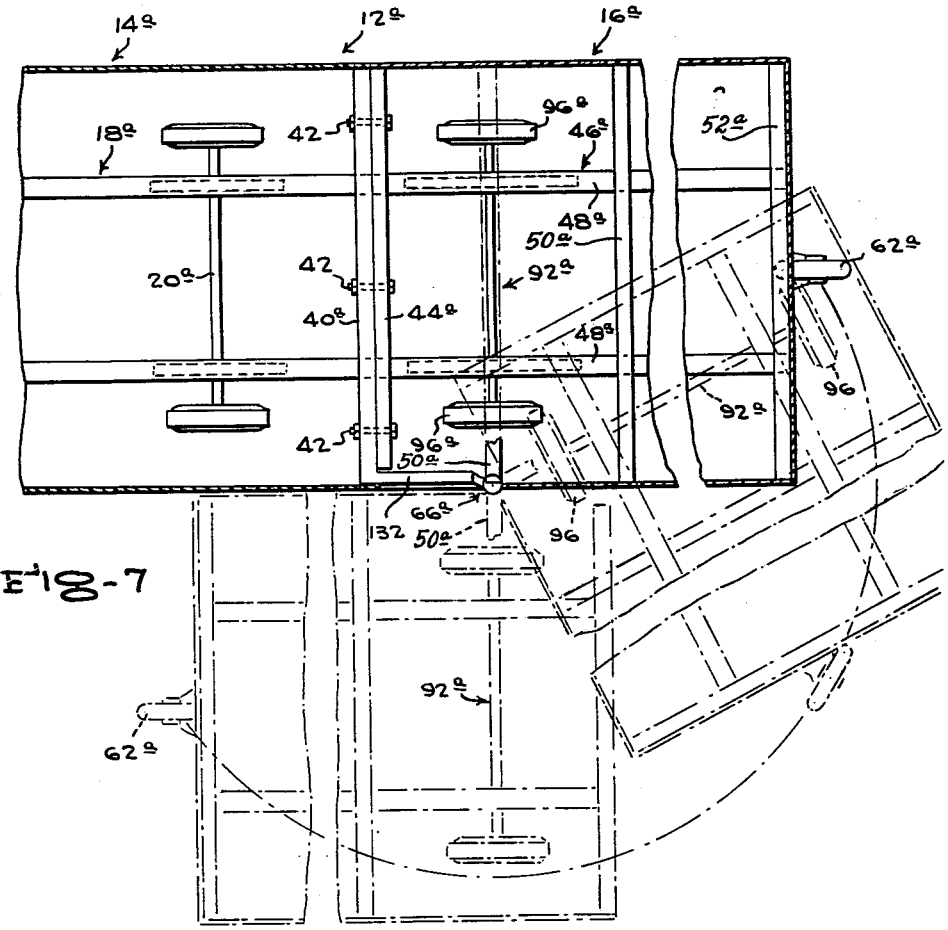
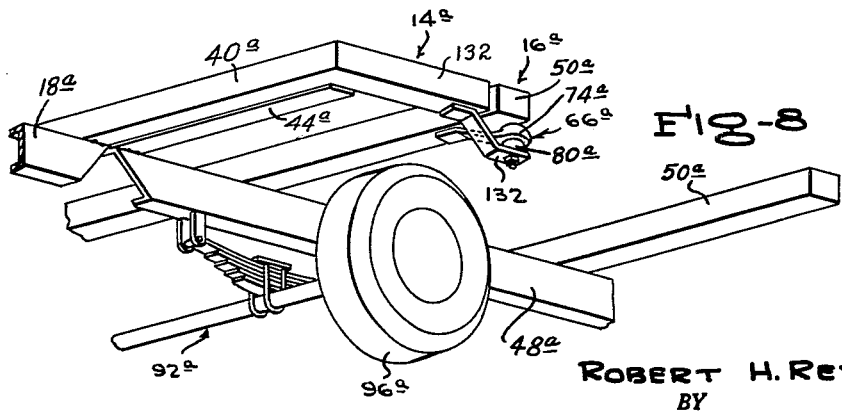

United States Patent Office 3,157,427
Patented Nov. 17, 1964

3,157,427
TRAILERS HAVING LATERALLY
SWINGABLE SECTIONS
Robert H. Reynolds, Memphis, Tenn.
(P.O. Box 22068, Fort Lauderdale, Fla.)
Filed June 9, 1961, Ser. No. 116,086
3 Claims. (Cl. 296—23)

This invention relates to novel section trailer vehicles whose sections are disposed in end-to-end relationship for towing, and are adapted to be swung into lateral relationships for parking.

The primary object of the invention is the provision of safer, more efficient, more practical, and more easily handled trailers of the kind indicated, especially in the form of mobile home trailers, whose sections can be easily and quickly moved between towing and parking relationships.

Another object of the invention is the provision of trailers of the character indicated above, whose sections, when in side-by-side relationship, can be in touching relationship, so that openings provided in the sidewalls of the sections, can be registered so that the trailers then provide double-width living space.

Other important objects and advantageous features of the invention will be apparent from the following description and the accompanying drawings, wherein, for purposes of illustration only, a specific form of the invention is set forth in detail.

In the drawings:

FIGURE 1 is a perspective view of a trailer of the present invention, with its sections connected together in tandem for towing;

FIGURE 2 is a perspective view showing the trailer sections pivoted into side-by-side relationship, with their ends aligned, for parking;

FIGURE 7 is a schematic and contracted horizontal section, like FIGURE 6, of another embodiment of the present invention, wherein the sections are shown in side-by-side, endwise offset relationship;

FIGURE 8 is an enlarged fragmentary perspective view showing the pivot means pivotally connecting the rear section to the forward section and the associated axle assembly wheel and cross and intermediate members of the two sections;

Figure 3:
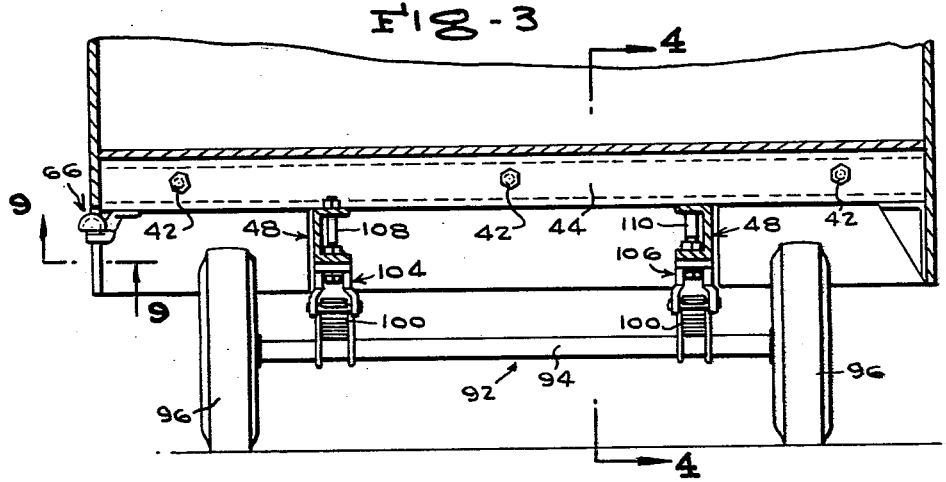
FIGURE 3 is an enlarged fragmentary vertical transverse section taken on the line 3—3 of FIGURE 1.

Referring in detail to the drawings, wherein like and related numerals designate like and related parts throughout the several views, and first to FIGURES 1 through 6, the trailer therein shown and generally designated 12, comprises a forward section 14 and a rear section 16.

The forward section 14 has a chassis frame 18 which is supported on fixed wheel axle 20, located intermediate its ends, and a draw bar 22 extends forwardly from the forward end of the frame 18. As shown in FIGURE 2, the adjacent ends of the trailer bodies 24 and 26 of the sections 14 and 16 have doors 28 and 30 which are registered with each other, in the tandem relationship of the sections, and the end walls 32 and 34, in which these doors are located, have laterally spaced upstanding lugs 36, which reach above the bodies, and are connected together, as by means of upper bolts 38 extending therethrough. The frame 18 of the forward trailer section 14 has a rear cross member 40, at its rear end, which, at transversely spaced intervals, is traversed by lower bolts 42, which extend also through a front end cross member 44, on the chassis frame 46 of the rear trailer section 16.

The chassis frame 46 of the rear trailer section 16 has parallel spaced side members 48, connected to the front cross member 44, to spaced intermediate cross members 50, and to a rear end cross member 52. The rear cross member 52 has a centered, rearwardly extending horizontal arm 54 thereon, carrying an upright tubular housing 56, in which the upright shaft 58 of a fork 60 is journalled, in which a steerable ground-engaging wheel 62 is carried. A crank handle 64 is supported on the housing 56 and is operatively connected, in suitable manner, to the shaft 58, whereby the wheel 62 can be adjusted, on the axis of the shaft 58 so as to position the axis of the wheel 62 normal to pivot means connecting the trailer sections 14 and 16 together and providing for lateral swinging of the rear section 16 relative to the forward section 14.

Figure 6:
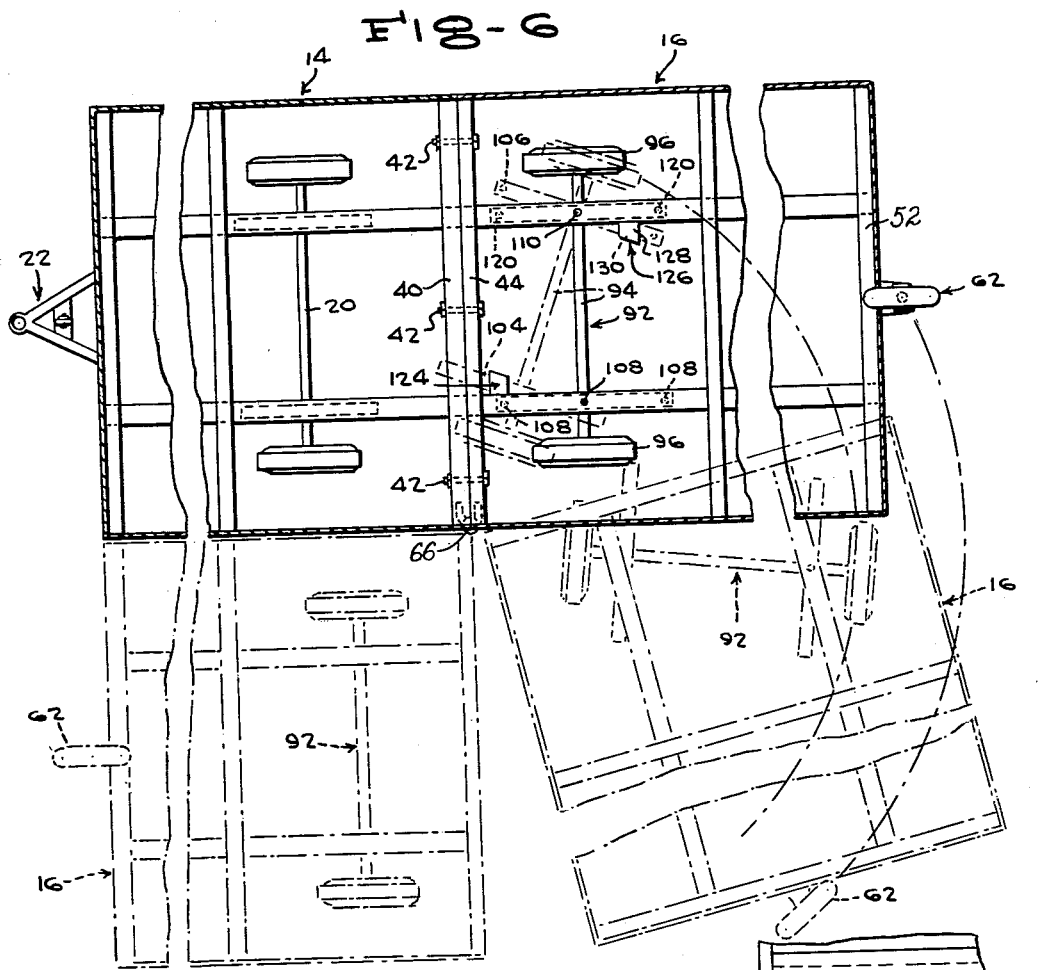
FIGURE 6 is a schematic and contracted horizontal section taken on the line 6—6 of FIGURE 4, showing the trailer sections connected together in tandem, in full lines, and disconnected and swung toward each other, in phantom lines.
Figure 9:
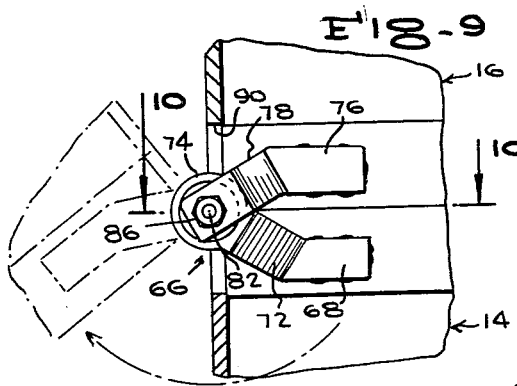
FIGURE 9 is an enlarged fragmentary horizontal section taken on the line 9—9 of FIGURE 3; and, FIGURE 10 is a transverse vertical section taken on the line 10—10 of FIGURE 9.
Figure 10:
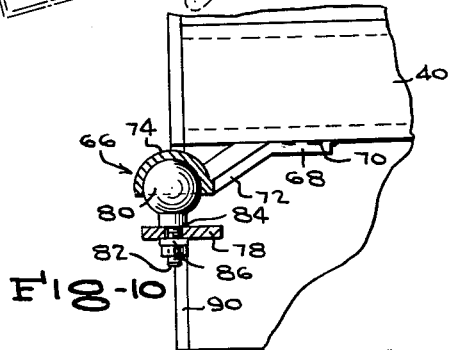

Such pivot means can take the form of a ball joint 66, as shown in FIGURES 3, 9 and 10, comprising an arm 68 fixed, as by weldings 70, to the underside of the rear cross member 40 of the forward section chassis frame 18. The arm 68 has a laterally outwardly extending, rearwardly angled portion 72 which terminates in a downwardly facing ball joint socket 74. An arm 76 is fixed to the underside of the front end cross member of the frame 18 of the rear trailer section 16, and has a laterally outwardly extending, forwardly angled portion 78, which is disposed beneath the socket 74, and carries an upstanding ball 80 which is engaged in the socket. As shown in FIGURE 10, the ball 80 is preferably removably mounted on the arm 76, and has a threaded shank 82 which extends downwardly through an opening 84 in the arm portion 78, and is secured in place by means of a nut 86. As indicated in FIGURES 1, 3 and 6, the axis of the ball joint 66 is located laterally outwardly of one end of the adjacent frame end members, in line with the related sidewalls 88 of the trailer section bodies 24 and 26, in which notches 90 can be formed to provide easy access to the ball joint 66, and clearance therewith.

Figure 4:
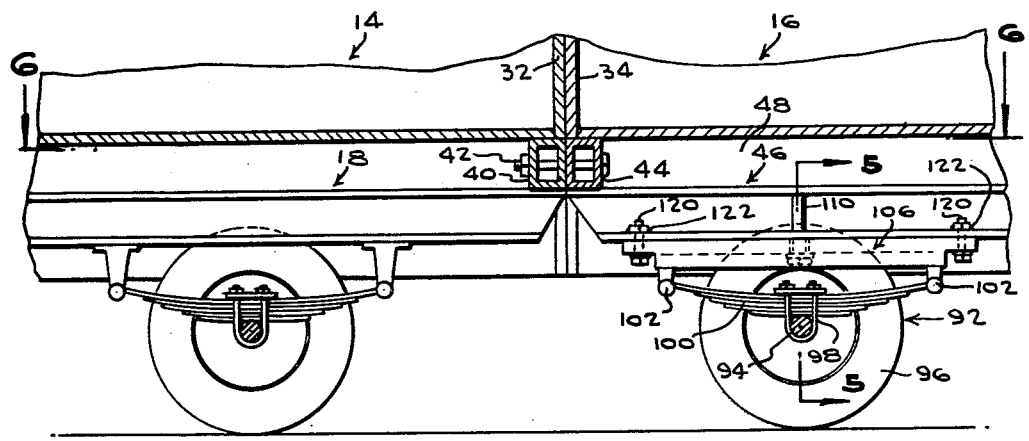
FIGURE 4 is a fragmentary vertical longitudinal section taken on the line 4—4 of FIGURE 3.
Figure 5:
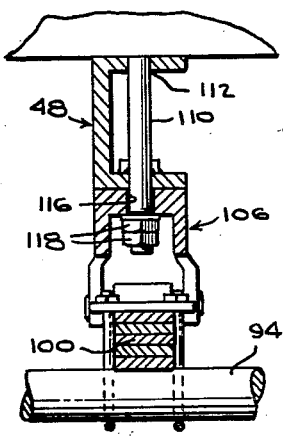
FIGURE 5 is a further enlarged vertical transverse section taken on the line 5—5 of FIGURE 4.

The rear trailer section chassis frame is supported by a wheeled axle assembly 92, which, as shown in FIGURES 3 to 5, preferably comprises a single transverse axle 94 having ground-engaging wheels 96, on its ends, and being secured, as indicated at 98, to the undersides of longitudinal leaf spring assemblies 100, which are shackled, at their ends, as indicated at 102, to the undersides of longitudinally elongated bolsters 104 and 106. The bolsters 104 and 106 extend along and bear against the undersides of the chassis frame side members, with the bolster 104 adjacent to the ball joint 66 and the bolster 106 remote from the ball joint.

The bolster 104 is not pivoted to the related side member 48, but is removably fixed thereto, by upstanding bolts 120, extending through its ends and its midpoint, which extend also through the side member.

The bolster 106, as shown in FIGURES 4 and 5, is fixedly pivoted at its midlength point, to the remote chassis side member 48, as by means of a vertical pivot bolt 110 which extends through and is fixed to the side member 48, as indicated at 112, and reaches therebelow and is journalled through a center hole 116, provided in the bolster 106, and has securing nuts 118 thereon, which bear against the underside of the bolster 106. The bolts 120 extend upwardly and through nuts 122 fixed on the remote chassis side member.

With the foregoing arrangement of the rear section axle assembly 92, the end bolts of the two bolsters 104 and 106 are adapted to be removed, when it is desired to pivot the rear trailer section 16 out of tandem relationship to the forward trailer section 14, and the single support wheel 62 is adjusted axially to the axis of the joint 66, so that, when the rear section 16 is pushed toward the ball joint equipped side of the forward section 14, the axle 94 pivots, on the pivot bolt 110, and swings toward the opposite side of the rear section 16, as indicated in FIGURE 6, so that the section 16 can be rolled on its axle assembly wheels 96 and the single wheel 62, into side-by-side registered relationship with the front trailer section 14.

As shown in FIGURE 6, limit stop means for the rear trailer section axle assembly 92 are preferably provided, which comprises stops 124 and 126, the stop 124 being located in front of the normal position of the axle 94, on the chassis side member adjacent to the ball joint 66, and the stop 124 being located behind the normal position of the axle 94, on the remote chassis side member. The stops 124 and 126 can comprise horizontal arms 128 extending laterally inwardly from the chassis side members, having pendant diagonal stop flanges 130, positioned to be engaged by related ones of the bolsters 104 and 106.

The embodiment of the invention shown in FIGURES 7 and 8, and generally designated 12a, differs from that shown in FIGURES 1 to 6, in that the need for a swingable axle assembly 92 is eliminated by having its ball joint 66a rearwardly offset from the rear end of the forward trailer section 14a, the swingable axle assembly being replaced by a fixed axle assembly 92a.

The ball joint 66a is at the rear end of a longitudinally elongated horizontal rearward extension arm 132 on the end of the rear end cross member 40a of the forward trailer section 14a, and in line with the fixed axle 92a of the rear trailer section 16a. By reference to FIGURE 8 it will be seen that the arm 132 carries an upstanding ball 80a which is embraced by a socket 74a carried by intermediate cross member 50a. With this arrangement, the rear trailer section 16a, when unconnected from the forward section 14a, is adapted to be rolled on its fixed axle wheels 96a and the adjustable single wheel 62a, to a position alongside of the forward section 14, wherein the ends of the sections are staggered, rather than aligned or registered with each other. With the offset pivotal arrangement of FIGURES 7 and 8, the rear trailer section 16a can be pushed into lateral relationship to the forward section 14a, by first angling the forward section 14a, relative to the rear section 16a, to the outside of the ball joint 66a, and then pushing the forward section rearwardly. This causes the rear section 16a to pivot, on the ball joint 66a, toward the same side of the forward section, as shown in phantom lines in FIGURE 7, until a side of the rear section 16a abuts against this same side of the forward section.

Although there have been shown and described herein preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:
1. A trailer comprising a wheeled forward section and a wheeled rear section, draft means on said forward section, said sections having meeting ends, means on said meeting ends for separably connecting the sections together in tandem towing relationship, said connecting means being separable to permit the rear section to be swung laterally relative to the forward section, and pivot means secured to the sections adjacent to their meeting ends, said pivot means comprising a longitudinally horizontal extension arm extending rearwardly from the forward trailer section at one side of the sections, and a ball and socket joint connecting said extension arm at its rear end to the said one side of the rear section at a location spaced rearwardly from the forward end of the rear section.

2. A trailer comprising a wheeled forward section and a wheeled rear section, draft means on said forward section, said sections having meeting ends, means on said meeting ends for separably connecting the sections together in tandem towing relationship, said connecting means being separable to permit the rear section to be swung laterally relative to the forward section, and pivot means secured to the sections adjacent to their meeting ends, said pivot means comprising a longitudinal horizontal extension arm extending rearwardly from the forward trailer section at one side of the sections, and a ball and socket joint connecting said extension arm at its rear end to the said one side of the rear section at a location spaced rearwardly from the forward end of the rear section, said forward and rear sections having single fixed transverse axles carrying ground engaging wheels.

3. A trailer comprising a wheeled forward section and a wheeled rear section, draft means on said forward section, said sections having meeting ends, means on said meeting ends for separably connecting the sections together in tandem towing relationship, said connecting means being separable to permit the rear section to be swung laterally relative to the forward section, and pivot means secured to the sections adjacent to their meeting ends, said pivot means comprising a longitudinal horizontal extension arm extending rearwardly from the forward trailer section at one side of the sections, and a ball and socket joint connecting said extension arm at its rear end to the said one side of the rear section at a location spaced rearwardly from the forward end of the rear section, said forward and rear sections having single fixed transverse axles carrying ground engaging wheels, said rear trailer section having a rear end, and a single adjustable ground engaging wheel on said rear end, said single wheel being rotatable to put its axis in line with said ball and socket joint as the rear section is swung laterally relative to the forward trailer section.

References Cited in the file of this patent
UNITED STATES PATENTS

| | | |
|---|---|---|
| 1,156,693 | Koger | Oct. 12, 1915 |
| 1,413,575 | Cochran | Apr. 25, 1922 |
| 2,743,784 | Karlsson | May 1, 1956 |
| 2,893,066 | Perdue | July 7, 1959 |
| 2,920,580 | Williams | Jan. 12, 1960 |

FOREIGN PATENTS

| | | |
|---|---|---|
| 870,645 | Germany | Mar. 16, 1953 |
| 866,281 | Great Britain | Apr. 26, 1961 |